United States Patent
Niu et al.

(10) Patent No.: US 10,558,388 B2
(45) Date of Patent: Feb. 11, 2020

(54) MEMORY SYSTEM AND METHOD OF CONTROLLING THE SAME

(71) Applicant: Samsung Electronics Co., Ltd., Suwon-si, Gyeonggi-do (KR)

(72) Inventors: Dimin Niu, Sunnyvale, CA (US); Mu-Tien Chang, Santa Clara, CA (US); Hongzhong Zheng, Los Gatos, CA (US); Craig Hanson, Champlin, MN (US); Sun Young Lim, Gyeonggi-do (KR); Indong Kim, Kyunggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 164 days.

(21) Appl. No.: 15/169,609

(22) Filed: May 31, 2016

(65) Prior Publication Data
US 2017/0255418 A1    Sep. 7, 2017

Related U.S. Application Data

(60) Provisional application No. 62/303,343, filed on Mar. 3, 2016.

(51) Int. Cl.
*G06F 3/06* (2006.01)

(52) U.S. Cl.
CPC ............ *G06F 3/0659* (2013.01); *G06F 3/061* (2013.01); *G06F 3/0679* (2013.01)

(58) Field of Classification Search
CPC ...... G06F 3/061; G06F 3/0659; G06F 3/0679; G06F 3/067; G06F 3/0685; G06F 11/1008; G06F 21/85; G06F 2212/222; G06F 2212/7202; G06F 3/0605; G06F 3/0607

See application file for complete search history.

(56) References Cited

U.S. PATENT DOCUMENTS

| | | | |
|---|---|---|---|
| 7,098,349 B2 | 8/2006 | Hamilton | |
| 7,321,524 B2 | 1/2008 | Shaeffer et al. | |
| 7,421,558 B2* | 9/2008 | Choi | G06F 13/1694 710/305 |
| 9,032,162 B1* | 5/2015 | Chang | G06F 13/161 711/149 |
| 9,202,585 B2* | 12/2015 | Lee | G11C 11/1673 |
| 2001/0003198 A1* | 6/2001 | Wu | G06F 13/4243 711/104 |
| 2004/0243753 A1* | 12/2004 | Horowitz | G06F 13/4072 710/301 |
| 2005/0182867 A1 | 8/2005 | Reynolds | |
| 2009/0240901 A1 | 9/2009 | Nakamura | |
| 2011/0289287 A1* | 11/2011 | Yamamoto | G06F 3/0605 711/156 |
| 2013/0097369 A1* | 4/2013 | Talagala | G06F 12/0246 711/103 |
| 2017/0235682 A1* | 8/2017 | Masuyama | G06F 12/1408 711/103 |

* cited by examiner

*Primary Examiner* — Zhuo H Li
(74) *Attorney, Agent, or Firm* — Lewis Roca Rothgerber Christie LLP

(57) ABSTRACT

A memory system includes: one or more memory modules, each comprising a plurality of memory devices having corresponding write commit policies; and one or more memory controllers coupled to the one or more memory modules, the one or more memory controllers having a configurable write operation protocol to operate with the memory devices according to the corresponding write commit policies.

19 Claims, 12 Drawing Sheets

| Function | CKE Pre | CKE Cur | CS_n | ACT_n | RAS_n/A16 | CAS_n/A15 | WE_n/A14 | BG0-BG1 | BA0-BA1 | C2-C0 | BC_n/A12 | A17 | A13 | A11 | A10/AP | A9-A0 |
|---|---|---|---|---|---|---|---|---|---|---|---|---|---|---|---|---|
| Bank Activate (ACT) | H | H | L | L | | RA | | BG | BA | | V | V | RA | V | V | |
| Write w Auto Precharge (Fixed BL8 or BC4) (WRA) | H | H | L | H | H | L | L | BG | BA | V | V | V | V | V | H | CA |

| Function | CKE Pre | CKE Cur | CS_n | ACT_n | RAS_n/A16 | CAS_n/A15 | WE_n/A14 | BG0-BG1 | BA0-BA1 | C2-C0 | BC_n/A12 | A17 | A13 | A11 | A10/AP | A9-A0 |
|---|---|---|---|---|---|---|---|---|---|---|---|---|---|---|---|---|
| Bank Activate (ACT) | H | H | L | L | | RA | | BG | BA | | V | V | RA | V | V | |
| Extended Write (EWR) | H | H | L | H | H | L | L | BG | BA | C | V | V | V | V | H | CA |

FIG. 15

| Function | CKE Pre | CKE Cur | CS n | ACT n | RAS n/ A16 | CAS n/ A15 | WE n/ A14 | BG0 - BG1 | BA0 - BA1 | C2-C0 | BC n /A12 | A17 | A13 | A11 | A10/ AP | A9-A0 |
|---|---|---|---|---|---|---|---|---|---|---|---|---|---|---|---|---|
| Bank Activate (ACT) | H | H | L | L | | RA | | | BA | V | | | | | | |
| RFU | H | H | L | H | L | H | H | BG | | | | | | RFU | | |

| Function | CKE Pre | CKE Cur | CS n | ACT n | RAS n/ A16 | CAS n/ A15 | WE n/ A14 | BG0 - BG1 | BA0 - BA1 | C2-C0 | BC n /A12 | A17 | A13 | A11 | A10/ AP | A9-A0 |
|---|---|---|---|---|---|---|---|---|---|---|---|---|---|---|---|---|
| Bank Activate (ACT) | H | H | L | H | | RA | | | BA | V | | | | | | |
| Extended Write (EWR) | H | H | L | H | L | H | H | BG | BA | V | V | L | V | V | H | CA |
| RFU | H | H | L | H | L | H | H | | | | RFU | | | | L | RFU |

FIG. 16

MEMORY SYSTEM AND METHOD OF CONTROLLING THE SAME

CROSS-REFERENCE TO RELATED APPLICATION

This utility patent application claims priority to and the benefit of U.S. Provisional Patent Application Ser. No. 62/303,343, filed Mar. 3, 2016, entitled "A Configurable Write Operation Protocol with Immediate Write Confirmation and No Write Confirmation Operations," the entire content of which is incorporated herein by reference.

BACKGROUND

One or more aspects of example embodiments of the present invention relate to a memory system and a method of controlling the same.

In recent years, next-generation main memory interfaces are trending toward being transaction based, with variable read and write timing, and may utilize either volatile or nonvolatile memory (NVM) technologies. Various nonvolatile memories that may be utilized on such transactional memory channels, however, may have different feedback information requirements from a dual in-line memory module (DIMM), and may have different write-commit mechanisms (or protocols or policies). Such write commit mechanisms may include confirming a write operation after directly writing to memory cells, confirming a write operation when data is written to a buffer (before other hardware writes the data back to memory cells), and in some instances no write confirmation may be provided after a page is opened. Without a mechanism for handling the different write commit mechanisms according to the different types of NVM technologies, a memory module having different NVM technologies incorporated into the same memory module may not function.

The above information disclosed in this Background section is provided for enhancement of understanding of the background of the invention, and therefore, it may contain information that does not constitute prior art.

SUMMARY

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

Aspects of example embodiments of the present disclosure relate to a memory system and a method of controlling the same.

According to some example embodiments according to the present disclosure, an asynchronized write operation protocol with both immediate write confirmation and no write confirmation operations may be utilized to control a memory device.

According to some example embodiments, a memory system includes one or more memory modules, each comprising a plurality of memory devices having corresponding write commit policies; and one or more memory controllers coupled to the one or more memory modules, the one or more memory controllers having a configurable write operation protocol to operate with the memory devices according to the corresponding write commit policies.

According to some embodiments, a first memory device from among the memory devices has a write commit policy in which a write is confirmed after directly writing to memory cells of the first memory device.

According to some embodiments, a second memory device from among the memory devices has a write commit policy in which a write is confirmed after writing to a volatile data buffer.

According to some embodiments, a third memory device from among the memory devices does not use write confirmation after page open.

According to some embodiments, the one or more memory controllers are configured to receive serial presence detect (SPD) information for the memory devices at power up of the memory system.

According to some embodiments, the one or more memory controllers are configured to reuse a double data rate generation 4 (DDR4) command that is not utilized for nonvolatile memory devices as a write operation command.

According to some embodiments, the one or more memory controllers are configured to utilize a command from among a set of commands reserved for future use (RFU) as a write operation command.

According to some embodiments, the configurable write operation protocol is compatible with a double data rate generation 4 (DDR4).

According to some embodiments, the configurable write operation protocol is compatible with a double data rate generation 4 (DDR4).

According to some example embodiments, in a method of controlling a memory system including one or more memory modules, each including a plurality of memory devices having corresponding write commit policies, the method includes: identifying a write commit policy utilized by each of the memory devices; receiving a write command from a processor; identifying a first memory device from among the plurality of memory devices that corresponds to the write command; and executing the write command according to the write commit policy of the memory device.

According to some embodiments, the first memory device from among the memory devices has a write commit policy in which a write is confirmed after directly writing to memory cells of the first memory device.

According to some embodiments, a second memory device from among the memory devices has a write commit policy in which a write is confirmed after writing to a volatile data buffer.

According to some embodiments, a third memory device from among the memory devices does not use write confirmation after page open.

According to some embodiments, the method further includes identifying the write commit policy utilized by each of the memory devices based on a readout of serial presence detect (SPD) information from an SPD area of each of the memory devices.

According to some embodiments, the memory system further comprises a memory controller coupled to the memory devices and having a configurable write operation protocol to operate with the memory devices according to their respective write commit policies.

According to some embodiments, the memory system includes a plurality of memory modules, wherein each of the memory devices in a same memory module have a same write commit policy that is different from a write commit policy of the memory devices in a different memory module.

According to some example embodiments, a memory system includes: one or more memory modules, each comprising a plurality of memory devices having corresponding write commit policies; and one or more memory controllers coupled to the one or more memory modules, wherein the one or more memory controllers are configured to: identify a write commit policy utilized by each of the memory devices; receive a write command from a processor; identify a first memory device from among the plurality of memory devices that corresponds to the write command; and execute the write command according to the write commit policy of the first memory device.

According to some embodiments, the first memory device from among the memory devices has a write commit policy in which a write is confirmed after directly writing to memory cells of the first memory device.

According to some embodiments, a second memory device from among the memory devices has a write commit policy in which a write is confirmed after writing to a volatile data buffer.

According to some embodiments, a third memory device from among the memory devices does not use write confirmation after page open.

This Summary is provided to introduce a selection of some features and concepts of example embodiments of the present disclosure that are further described below in the detailed description. This Summary is not intended to identify key or essential features of the claimed subject matter nor is it intended to be used in limiting the scope of the claimed subject matter. One or more of the described features according to one or more example embodiments may be combined with one or more other described features according to one or more example embodiments to provide a workable device.

BRIEF DESCRIPTION OF THE DRAWINGS

A more complete appreciation of the present disclosure, and many of the attendant features and aspects thereof, will become more readily apparent as the disclosure becomes better understood by reference to the following detailed description when considered in conjunction with the accompanying drawings in which like reference symbols indicate like components, wherein:

FIG. 15 is an example of a new command set that reuses a current command set that is not used for nonvolatile (NVM) memory according to one or more example embodiments of the present invention;

FIG. 16 is another example of a new command set that is not used in current DDR protocol according to one or more example embodiments of the present invention.

DETAILED DESCRIPTION

Figure 1:
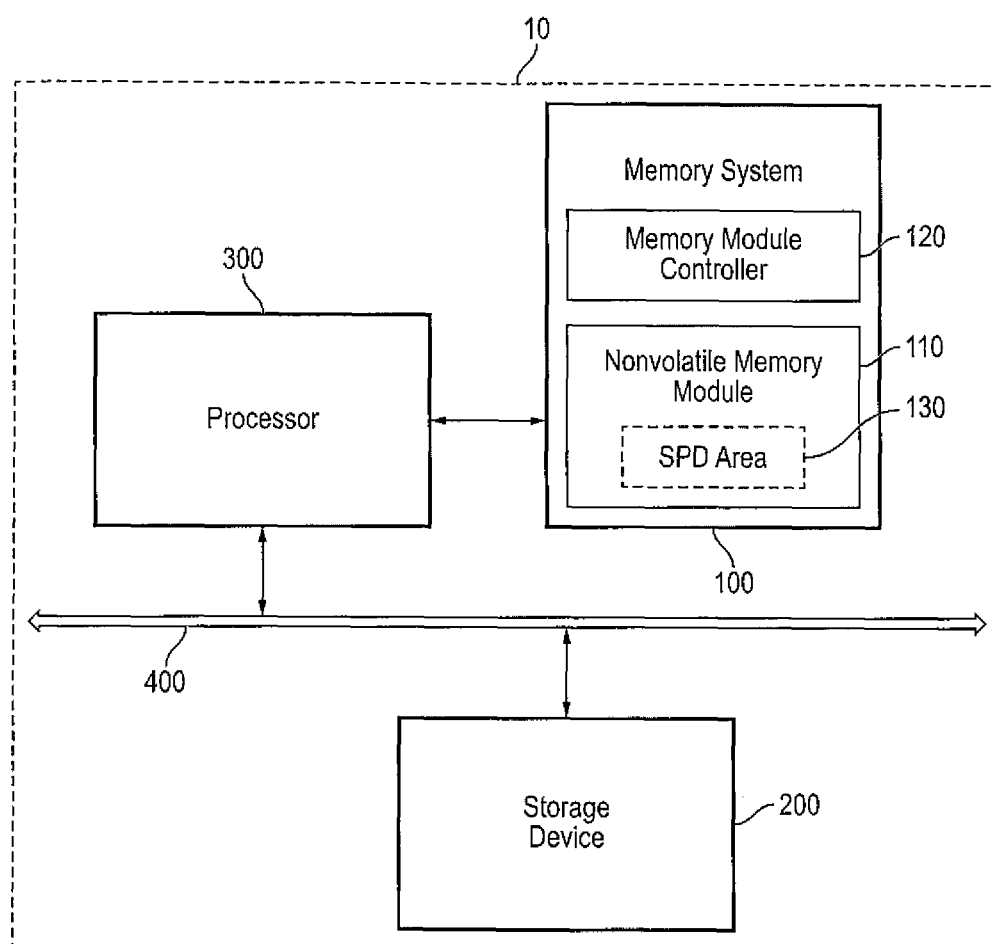
FIG. 1 is a schematic block diagram of a computing system according to one or more example embodiments of the present invention.

Hereinafter, example embodiments of the present disclosure will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated.

Aspects of embodiments of the present disclosure relate to a memory device and a method of controlling the same.

According to trends for next-generation memory interfaces, transaction based interfaces for nonvolatile memory (NVM) may be utilized with a main memory module. Different NVM technologies utilize different write commit mechanisms, however. For example, in some NVM devices, writes are confirmed after directly writing to memory cells. In other words, when an I/O write instruction is provided to an NVM device by or through an NVM controller or a register clock driver (RCD) chip, the NVM device sends an acknowledgement.

In other NVM devices, writes are confirmed after writing to a volatile data buffer, and additional hardware is responsible for buffer write back, such as in a manner similar to flash memory. In other words, when an I/O write instruction is provided to an NVM device by or through an NVM controller or an RCD chip, the volatile data buffer (e.g., a volatile memory) forwards the I/O write instruction to the NVM device, and sends an acknowledgement. In yet other NVM devices, write confirmations are not needed after a page open, but hardware is responsible for page write back, in a manner similar to DRAM.

Therefore, a single write operation protocol cannot effectively be utilized with all of the various NVM technologies that utilize different write mechanisms. For example, using DRAM-like devices with a communication protocol that requires immediate write confirmation wastes memory bandwidth. On the other hand, flash memory-like devices cannot be directly used with the standard double data rate generation 4 (DDR4) protocol because of the lack of feedback (e.g., confirmation or acknowledgement).

Thus, according to one or more embodiments of the present invention, an asynchronized write operation protocol may be utilized with both immediate write confirmation and no write confirmation operations.

According to one or more example embodiments, the protocol may have one or more of, but is not limited to, the following features: 1) a configurable write confirmation policy; 2) compatibility with DDR protocols; 3) the write confirmation policies utilized by different NVM devices (e.g., write with confirmation and write without confirmation) is read out by the memory controller through serial presence detect (SPD) during boot up of the memory module; 4) the memory controller policy is decoupled from the communication protocol and supports both open and close page policies; 5) a device write back mechanisms policy is decoupled from the communication protocol and supports devices with write back buffers or write through buffers; 6) an extended write (EWR) command with confirmation may be utilized according to the NVM technology; 7) the EWR command can either use the RFU command set in the DDR4 protocol (e.g., the current DDR4 protocol), or reuse commands from the DDR4 commend set; and 8) the memory device may be utilized without changes to timing parameters.

Figure 2A:
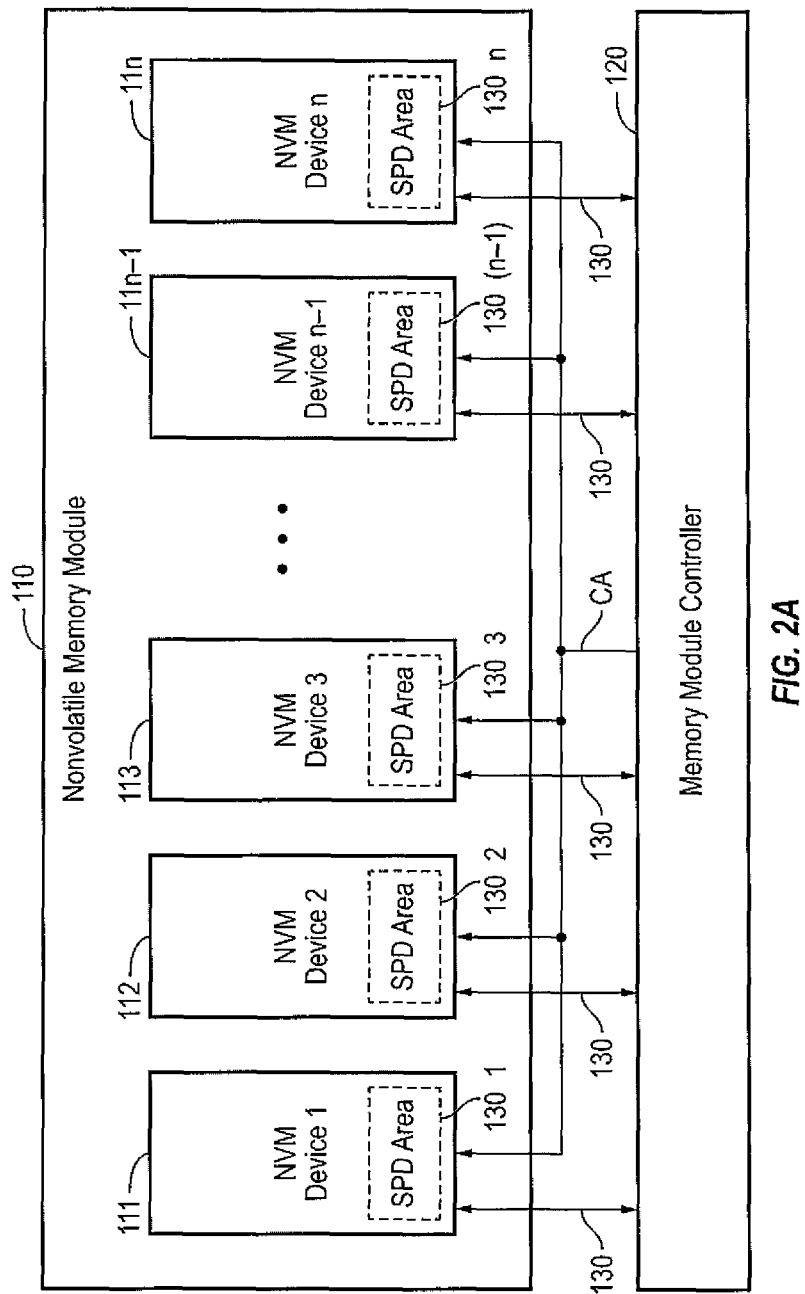
FIGS. 2A and 2B are a schematic block diagrams of a memory system according to one or more example embodiments of the present invention.
Figure 2B:
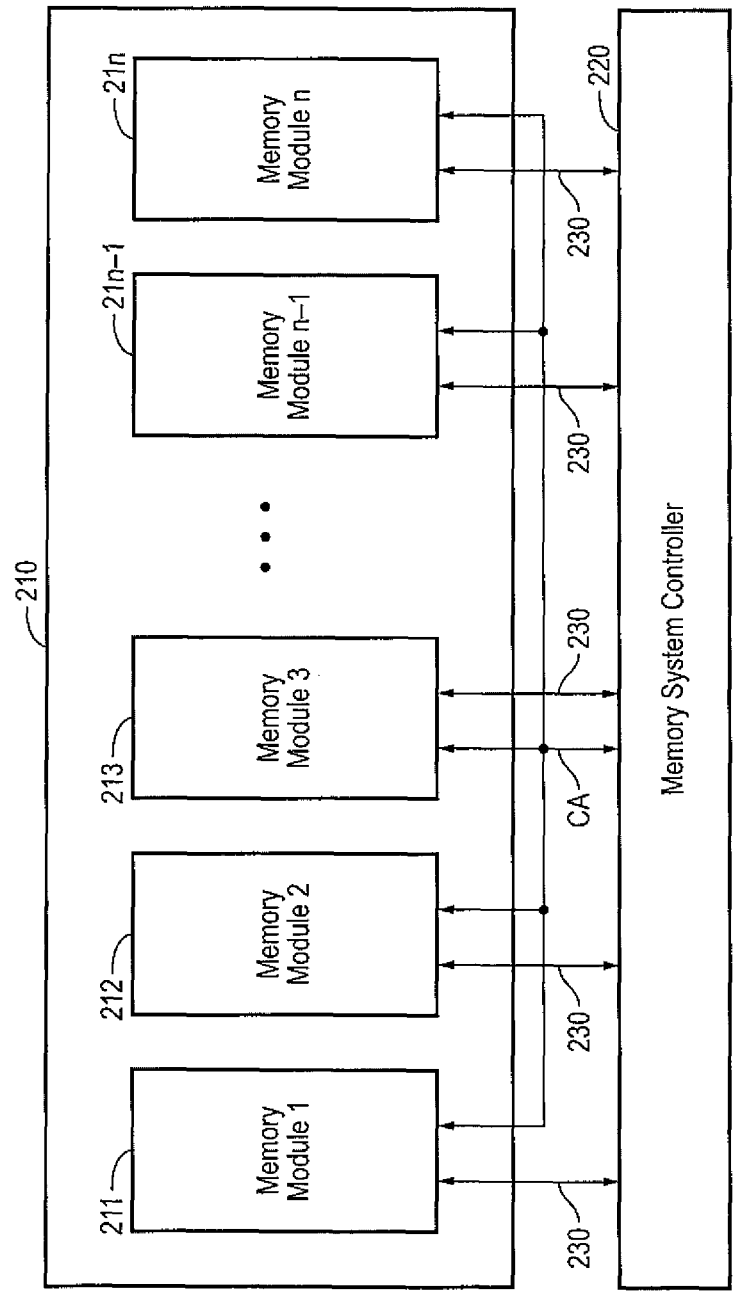

FIG. 1 is a schematic block diagram of a computing system according to one or more example embodiments of the present invention. FIGS. 2A and 2B are schematic block diagrams of a memory system according to one or more example embodiments of the present invention.

Referring to FIG. 1, a computing system 10 according to one or more example embodiments of the present invention includes a memory system 100, a storage device 200, a processor 300, and a system bus 400. The storage device 200 may store any data required/used for the operation of the computing system 10. For example, the storage device 200 may be used to store system software, application software, user data and/or any other suitable data required/used for the operation of the computing system 10. In one or more example embodiments according to the present invention, the storage device 200 may include a hard disk drive (HDD), solid state drive (SSD), a nonvolatile memory such as a flash memory, a phase change RAM (PRAM), a magnetic RAM (MRAM), a resistive RAM (RRAM), a ferroelectric RAM (FRAM), and/or the like.

The memory system 100 may be utilized as a working memory or main memory of the computing system 10. Thus, according to some embodiments, the components of the memory system 100 may be integrated into a single component. The memory system 100 may be configured to store data processed by and/or data to be processed by the processor 300.

According to some embodiments, the memory system 100 may include an NVM module 110 and a memory module controller 120. The memory module controller 120 is configured to control the NVM module 110 according to control signals from the processor 300. For example, the memory module controller 120 may receive a write command and write data from the processor 300, and may control the NVM module 110 to store the write data. Additionally, the memory module controller 120 may receive a read command from the processor 300 and may control the NVM module 110 to perform a read operation, corresponding to requested data, from among data that is stored at the NVM module 110.

As will be shown and described in more detail below, the NVM module 110 may include a plurality of NVM devices, utilizing different NVM technologies. As shown in FIG. 1, the NVM module 110 may include a serial presence detect (SPD) area 130, in which SPD information is stored. According to some embodiments, the SPD area 130 may also be stored in a dedicated chip in the memory system 100 with a dedicated communication path. During boot (e.g., power up) of the computing system 10 and/or the memory system 100, the SPD information is read by the memory controller 120 and/or the processor 300, so as to detect the types of NVM devices that are included within the NVM module 110.

The memory controller 120 according to one or more example embodiments of the present invention has a configurable write operation protocol with at least immediate write confirmation and no write confirmation operations. For example, the memory controller 120 may utilize SPD readout information from different NVM devices of the NVM module 110 to determine how to handle the different read/write requirements of different NVM devices.

Referring to FIG. 2A, the NVM module 110 includes a plurality of NVM devices 111, 112, 113 through 11($n$−1) and 11$n$. The number of NVM devices included as part of the NVM module 110 may vary according to the design and function of the NVM module 110. Each of the NVM devices 111 to 11$n$ may exchange data 130 with the memory module controller 120 in response to a command CA from the memory module controller 120. Each of the NVM devices 111 to 11$n$ may perform a read or write operation in response to the command CA from the memory module controller 120.

For example, the nonvolatile memory devices 111 to 11$n$ may perform a read or write operation in parallel. That is, the nonvolatile memory devices 111 to 11$n$ may perform a read or write operation independently and/or concurrently. In other example embodiments, read or write operations of the NVM devices 111 to 11$n$ may be performed sequentially.

In example embodiments, SPD information may be stored at each of the nonvolatile memory devices 111 to 11$n$. For example, the SPD area 130 in FIG. 1 may include a plurality of SPD areas 130_1, 130_2, 130_3 through 130_($n$−1) and 130_n, such that each of the NVM devices 111 to 11$n$ includes a respective SPD area (or SPD sub-area). Accordingly, separate and distinct SPD information may be stored in each of the NVM devices 111 to 11$n$, such that, for example, the memory module controller 120 may obtain SPD information stored in the respective SPD areas that is specific to the corresponding NVM devices 111 to 11n. According to some embodiments, the SPD information for each of the NVM devices 111 to 11n may be stored in one or more SPD chips corresponding to the memory module 110 that are separate from the NVM devices 111 to 11n. According to some embodiments, such SPD information may be obtained by the memory module controller 120 upon startup or boot up of the computer system 10 or the memory system 100. Thus, the memory module controller 120 may perform a setting operation for and control the NVM devices 111 to 11n such that specific write and/or read operations may be performed according to the NVM technology of each corresponding NVM device and the SPD information stored at each of the NVM devices 111 to 11n, or the SPD information stored in one or more SPD chips corresponding to the memory module.

By setting the memory module controller 120 with the SPD information in each of the NVM devices, different write and/or read operations may be performed for the different NVM devices 111 to 11n depending on the NVM technology. For example, according to one or more example embodiments, the way or method in which a write instruction is confirmed by different NVM devices may be set differently. The memory controller 120 may schedule a "write with confirmation" or "write without confirmation" command according to, for example, dual in-line memory module (DIMM) information obtained through the SPD readout.

According to some embodiments, a memory system 210 (e.g., included as part of the memory system 100 in FIG. 1) may include a plurality of memory modules 211, 212, 213 through 21n-1 and 21n, as illustrated in FIG. 2B. The number of memory modules included as part of the memory system 210 may vary according to the design and function of the memory system 210. Each of the memory modules 211 through 21n may include a plurality of memory devices (e.g., a plurality of memory modules that are the same as or similar to the memory module 110 shown in FIG. 2A, each having a plurality of the NVM devices 111 through 11n), and may exchange data 230 with a memory system controller 220 in response to a command CA from the memory system controller 220. According to some embodiments, the memory system controller 220 may be included as part of the host (e.g., the processor 300 in FIG. 1). According to embodiments in which the memory system includes a plurality of memory modules, different memory modules may have different write confirmation policies, but NVM devices in the same module may all have the same write confirmation policy.

According to one or more example embodiments, the memory controller policy may be decoupled page open policy such that the system will decide the open/close page policy. That is, according to some embodiments, the memory controller may choose either an open page or close page policy, regardless of which write confirmation policy is utilized in the memory device. In addition, according to one or more example embodiments, the command set changes may be kept to a minimum, such that current commands may be reused or a single command may be added. There may be no timing parameter changes, and compatibility with current DDR protocol may be maintained.

Hereinafter, configuration of write confirmation according to one or more example embodiments of the present invention is described in further detail. The memory module controller 120 may read the write confirmation requirement from a dual in-line memory module (DIMM) through SPD during booting. Here, the DIMM may specify the required write confirmation policy. For example, if the hardware can ensure reliable buffer write back, no confirmation may be required after activation. If, however, the hardware does not provide support for buffer write back, every write transaction may need a write confirmation.

According to one or more example embodiments of the present invention, a memory controller scheduler (e.g., in the memory controller 120) may be utilized for scheduling "write with confirmation" or "write without confirmation" commands according to the SPD readout. Because different (or different types of) NVM devices may be associated with different channels, different channels may have different write confirmation policies. Further, different rank or ranks in the same channel or in different channels may have different write confirmation policies. In addition, different bank or banks in the same rank or in different ranks may have different write confirmation policies.

Figure 3:
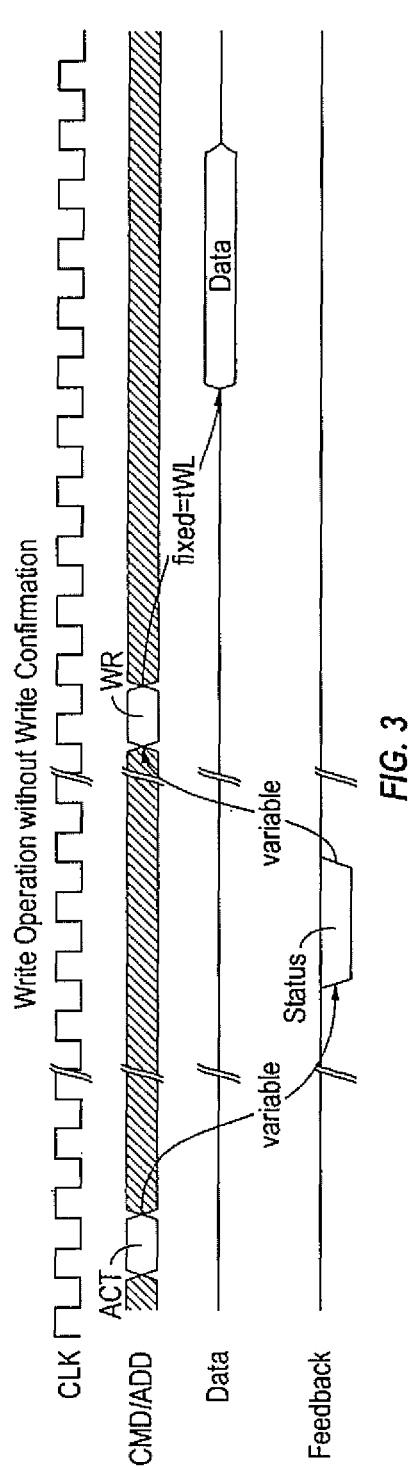
FIG. 3 is a timing diagram illustrating a write operation without write confirmation according to one or more example embodiments of the present invention.

FIG. 3 is a timing diagram illustrating a write operation for utilizing with an NVM device without write confirmation according to one or more example embodiments of the present invention.

For example, the memory module controller 120 may issue write operation command without write confirmation to one or more of the NVM devices having corresponding write commit mechanisms according to example embodiments of the present invention. As can be seen in FIG. 3, the memory controller issues an activation operation (ACT) command to a particular memory address (e.g., to a specific bank of an NVM device or NVM devices) and requires a status feedback (e.g., Status) from the DIMM indicating that the activation operation was successful. After receiving the successful activation status, data may be held in a data buffer and may be operated with the same timing as DRAM. Then the memory module controller 120 issues a regular write operation (WR) command to write data to the NVM device, and after a fixed latency, the data is transmitted to the data bus of the memory system 100 and written the corresponding cells of the corresponding NVM device. Because the NVM devices used with this protocol technology does not require a write confirmation, the write operation is then completed.

Figure 4:
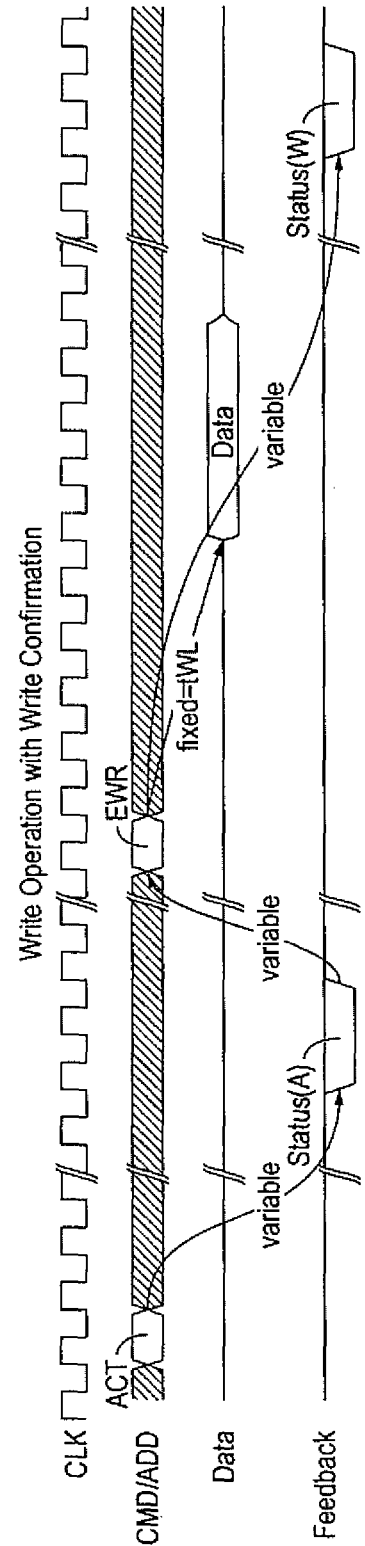
FIG. 4 is a timing diagram illustrating a write operation with write confirmation according to one or more example embodiments of the present invention.

FIG. 4 is a timing diagram illustrating a write operation for utilizing with an NVM device with write confirmation according to one or more example embodiments of the present invention.

For example, the memory module controller 120 may issue an extended write operation (EWR) command with write confirmation to one or more of the NVM devices having corresponding write commit mechanisms. As can be seen in FIG. 4, activation is substantially the same as the case of FIG. 3, in which the activation requires a status feedback for activation (e.g., Status(A)). The memory module controller 120 then issues (e.g., sends a command for) an EWR command to write data to a particular memory address (e.g., to a specific bank of an NVM device or NVM devices). After a variable latency, the DIMM sends a write confirmation back to the memory module controller 120. Thus, according to the protocol illustrated in FIG. 4, the memory module controller 120 awaits a successful write confirmation (e.g., Status(W)) prior to issuing any other operation (or command) to the same bank or DIMM.

Figure 5:
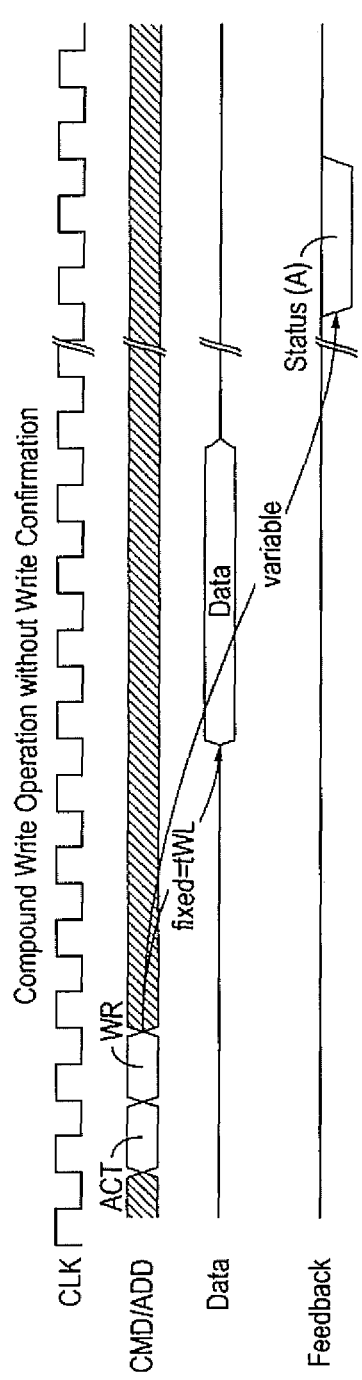
FIG. 5 is a timing diagram illustrating a compound write operation without write confirmation according to one or more example embodiments of the present invention.
Figure 6:
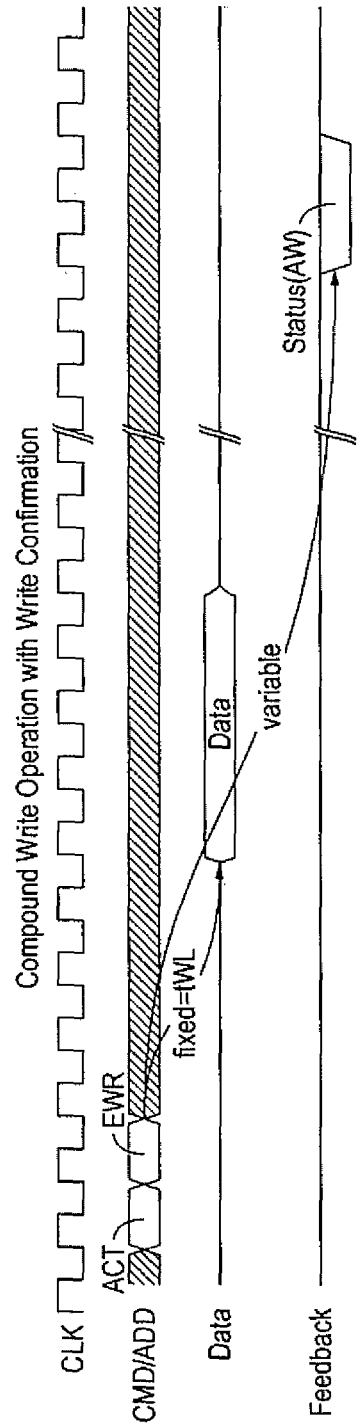
FIG. 6 is a timing diagram illustrating a compound write operation with write confirmation according to one or more example embodiments of the present invention.

FIGS. 5 and 6 respectively illustrate compound write operations without write confirmation and with write confirmation according to one or more example embodiments of the present invention.

The commands issued by the memory module controller 120 in FIGS. 5 and 6 are substantially similar to those issued in FIGS. 3 and 4, respectively, except that the commands in FIGS. 5 and 6 are for respective compound write operations in which the respective write operation commands (WR) are compounded with an activation operation command (ACT) according to their respective write commit mechanisms.

As shown in FIG. 5, a compound command of activation and write operations are issued to a particular memory address (e.g., to a specific bank of an NVM device or NVM devices), and a data write is initiated after a fixed latency. Then, the memory controller awaits a successful activation confirmation (e.g., Status(A)). The command issued by the memory controller in FIG. 6 is substantially the same as the one issued in FIG. 5, except that the memory controller in FIG. 6 awaits a compound status feedback of successful activation plus write confirmation (e.g., Status(AW)) prior to issuing any other operation (or command) to the same bank.

Figure 7:
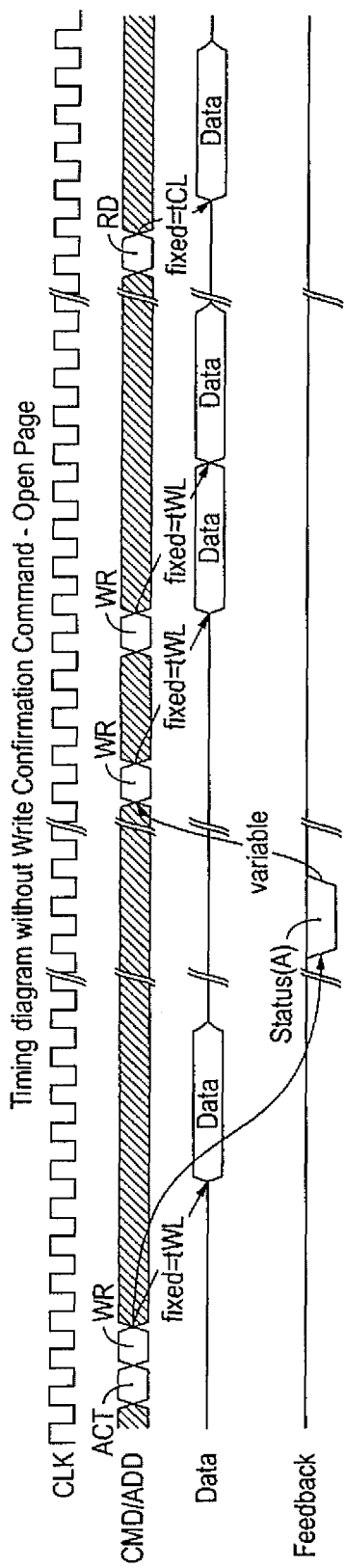
FIG. 7 is a timing diagram illustrating a write operation without write confirmation command with an open page policy according to one or more example embodiments of the present invention.

FIG. 7 is an example timing diagram illustrating a sequence of operations for writing and reading data with an NVM device having an open page policy without utilizing a write confirmation according to some embodiments of the present invention.

The timing diagram and the write commit mechanism of FIG. 7 is substantially similar to the one illustrated in FIG. 5, except that additional write (WR) and read (RD) operations are commanded to the same bank under an open page policy. Because sense amplifiers are always open under the open page policy, no additional activation operation (ACT) commands are required to the same bank under the open page policy. Therefore, only the write (WR) and read (RD) commands are issued after the initial activation status feedback (e.g. Status(A)) has been received. Additionally, write operations and read operation commands can be issued consecutively without confirmation.

Figure 8:
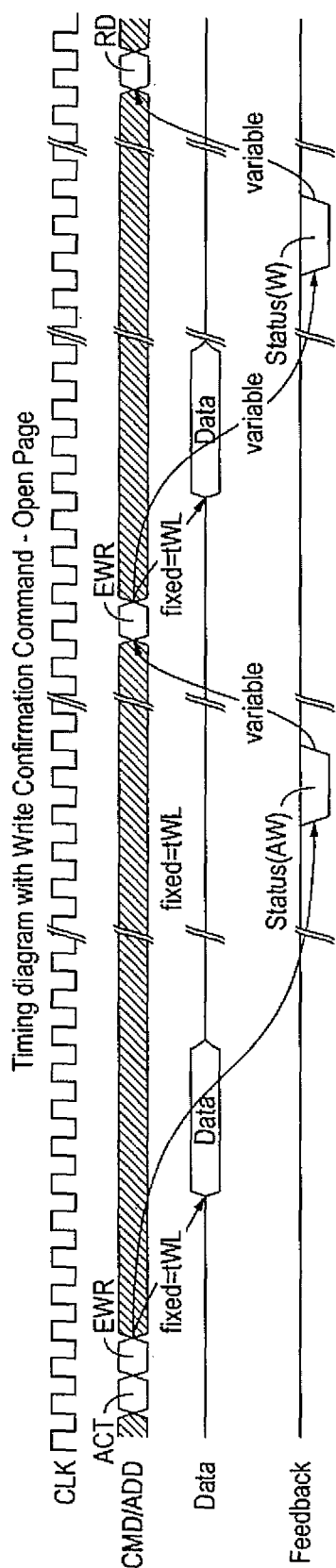
FIG. 8 is a timing diagram illustrating a write operation with immediate write confirmation command with an open page policy according to one or more example embodiments of the present invention.

FIG. 8 is an example timing diagram illustrating a sequence of operations for writing and reading data with an NVM device having an open page policy with a write confirmation according to some embodiments of the present invention.

The timing diagram and the write commit mechanism of FIG. 8 are substantially similar to the one illustrated in FIG. 6, except that additional extended write (EWR) and read (RD) operations are commanded to the same bank under an open page policy. Because sense amplifiers are always open under the open page policy, no additional activation commands are required to the same bank under the open page policy. Therefore, only the extended write (EWR) and read (RD) commands are issued after the initial activation+write status feedback (e.g. Status(AW)) has been received. It should be noted that unlike the no write confirmation operation depicted in FIG. 7, the memory controller awaits a status feedback (e.g., Status(W)) after issuing each extended write (EWR) command prior to issuing any other operation (or command) to the same bank.

Figure 9:
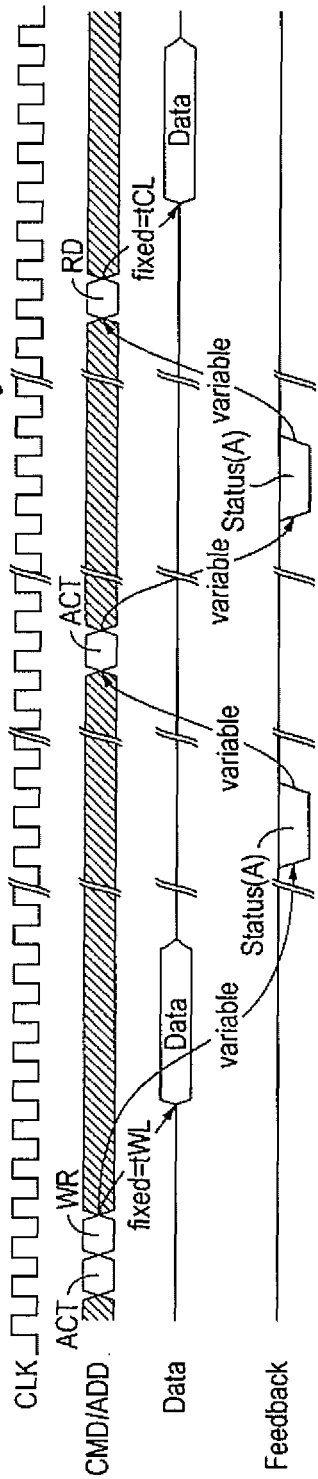
FIG. 9 is a timing diagram illustrating a write operation without write confirmation command with a close page policy according to one or more example embodiments of the present invention.

FIG. 9 is an example timing diagram illustrating a sequence of operations for writing and reading data for an NVM device having a close page policy without utilizing a write confirmation according to some embodiments of the present invention. As shown in FIG. 9, the memory module controller 120 issues a compound activation and write operation command, and after a fixed latency, the data is provided to the data bus of the NVM device. Then, a successful activation status confirmation (e.g., Status(A)) is provided by the DIMM to the memory module controller 120, without providing a write confirmation. To perform another write operation, another activation command is issued, followed by a corresponding activation status confirmation. As can be seen in FIG. 9, the memory module controller 120 issues an activation operation command to the same bank and awaits an activation status feedback (e.g., Status(A)) prior to issuing a read operation (RD) command because of the close page policy, under which sense amplifiers are not always open.

Figure 10:
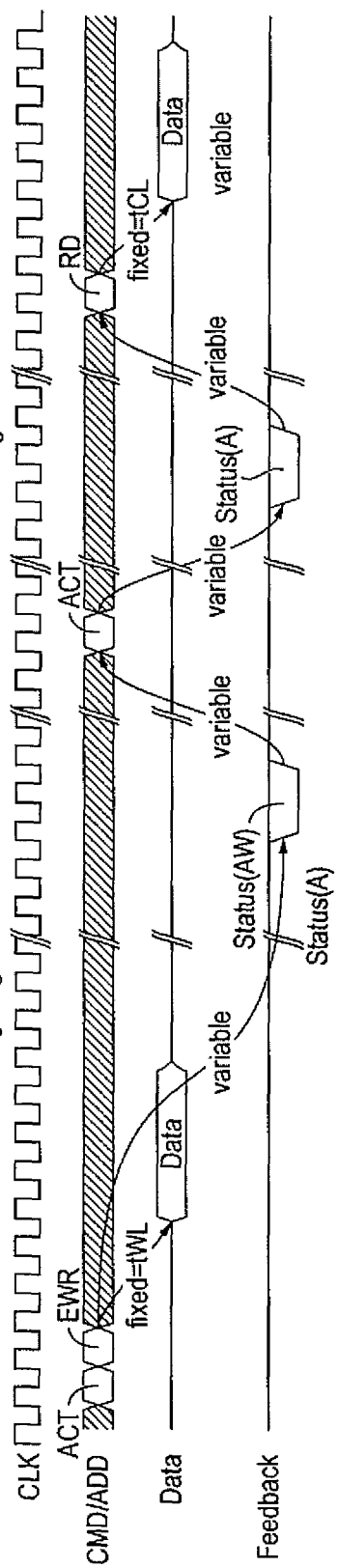
FIG. 10 is a timing diagram illustrating a write operation with immediate write confirmation command with a close page policy according to one or more example embodiments of the present invention.

FIG. 10 is an example timing diagram illustrating a sequence of operations for writing and reading data for an NVM device having a close page policy with a write confirmation according to some embodiments of the present invention.

The timing diagram and the write commit mechanism of FIG. 10 is similar to the one illustrated in FIG. 8, except that the memory controller issues an activation operation (ACT) command after the EWR operation prior to issuing a read (RD) operation command under a close page policy. As can be seen in FIG. 10, the memory module controller 120 issues another activation operation (ACT) command to the same bank after the receipt of the activation plus write status feedback (e.g., Status(AW)), and awaits an activation status feedback (e.g., Status(A)) prior to issuing a read operation (RD) command because of the close page policy, under which sense amplifiers are not always open.

Figure 11:
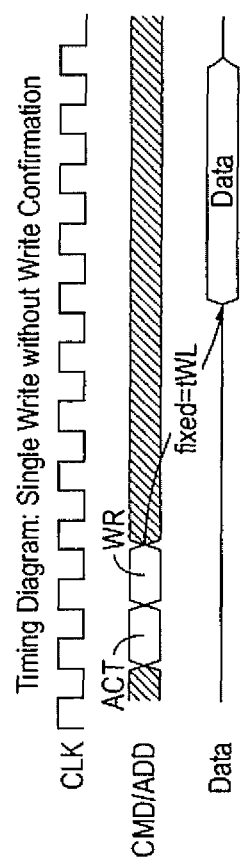
FIG. 11 is a timing diagram illustrating a single write operation without a write confirmation according to one or more example embodiments of the present invention.

FIG. 11 is a timing diagram illustrating a single write operation without a write confirmation according to one or more example embodiments of the present invention. For embodiments in which a memory device is a flash memory or non-volatile memory express (NVMe) like NVM device, a write buffer may handle incoming write operations, and a page open may not be required before a write operation is performed. Accordingly, there may be no need to obtain confirmation of an activation command, as illustrated in FIG. 11. Additionally, the host or memory controller (or memory system controller) may track the available entries in the module write buffer and ensure all write operations can be buffered in the corresponding memory module. In such configurations, as illustrated in FIG. 11, a compound command of activation and write operations is issued to a particular memory address (e.g., to a specific bank of a memory device or memory devices), and a data write command is initiated after a fixed latency, similar to the sequence illustrated in FIG. 5. Because confirmation of the activation command is not needed, however, in contrast to FIG. 5, no activation confirmation may be issued.

Figure 12:
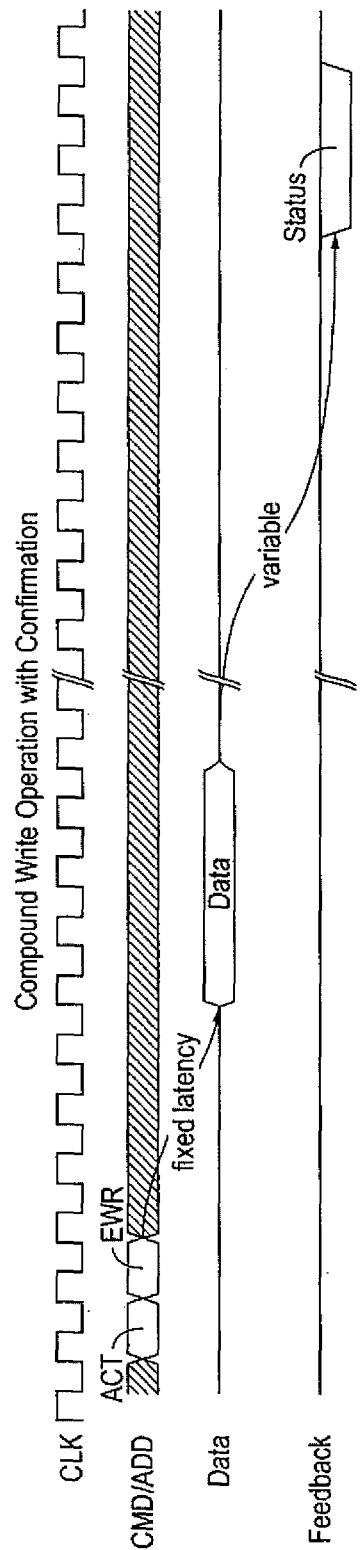
FIG. 12 is a timing diagram illustrating a compound write operation with confirmation according to one or more example embodiments of the present invention.

FIG. 12 is a timing diagram illustrating a compound write operation with confirmation according to one or more example embodiments of the present invention. The timing diagram of FIG. 12 is substantially similar to the one illustrated in FIG. 11, except the write command is an extended write (EWR) with confirmation command. Again, for flash or NVMe like NVM devices, a page open command may not be required before a write operation is performed. Accordingly, an activation confirmation may not be provided. In such configurations, as illustrated in FIG. 12, a compound activation and EWR command may be issued, and after a fixed latency, the write operation may be performed. Because the EWR command utilizes a write confirmation, after a variable latency, the status of the write confirmation maybe issued, without an activation confirmation.

Figure 13:
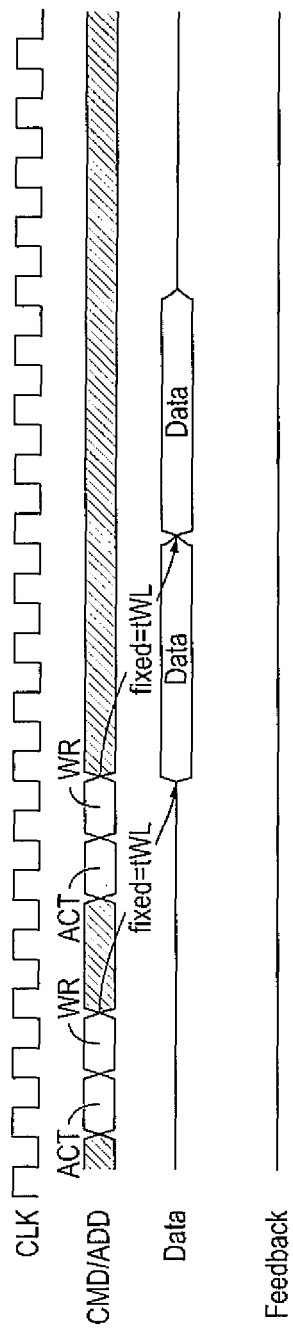
FIG. 13 is a timing diagram illustrating consecutive write operations by utilizing a write credit counter according to one or more example embodiments of the present invention.

FIG. 13 is a timing diagram illustrating consecutive write operations by utilizing a write credit counter according to one or more example embodiments of the present invention. According to some embodiments, the host or memory module controller (or memory system controller) may utilize a write credit counter. After issuing a write operation, the write credit counter is decreased by one credit, and as long as the write credit counter is greater than zero, the hose may continue issuing write commands. According to some embodiments, the host may pull the write credit from a memory module using a special command. For example, as illustrated in FIG. 13, prior to issuing a write command, the write credit counter may be set to an integer greater than zero (e.g., 2). Accordingly, the host may issue compound activation and write commands, subtracting one credit from the write credit counter after each write command, until the write credit counter is no longer greater than zero.

Figure 14:
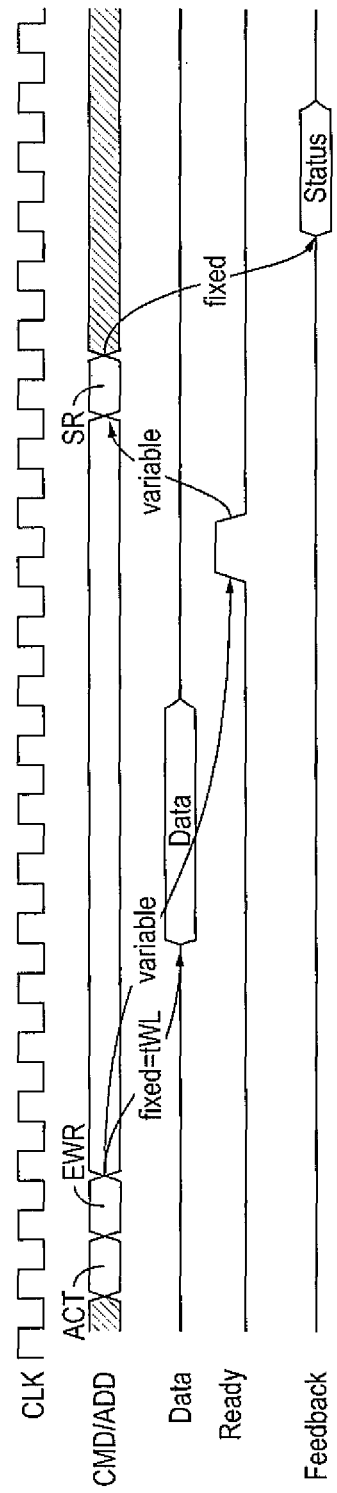
FIG. 14 is a timing diagram illustrating a mechanism for feedback control in which a host may read a memory module status according to one or more example embodiments of the present invention.

FIG. 14 is a timing diagram illustrating a mechanism for feedback control in which a host may read a memory module status according to one or more example embodiments of the present invention. According to some embodiments of the present invention, the memory modules or memory devices may not automatically provide feedback to the host or memory controller (or memory system controller) following execution of a command. Instead, the memory modules or memory devices may issue a ready notification or signal to the host, and the host is responsible for pulling the status from the corresponding memory module or memory device. As shown in FIG. 14, a compound command of activation and EWR may be issued to a memory address, and a data write is initiated after a fixed latency. Then, after a variable latency following the EWR operation, a ready notification may be transmitted to the host or memory module controller (or memory system controller), indicating the memory device or memory module is ready to provide status information, such as write confirmation information, write credit updates, and the like. Accordingly, after a variable amount of time, the host may then issue a status read (SR) command, requesting the status information from the corresponding memory device or memory module, and after a fixed latency, the status information may be provided from the memory module or memory device to the host.

Although certain commands and operations described above may be described with respect to FIG. 2A and the memory module 110, a person having ordinary skill in the art will appreciate that embodiments of the present invention may be applied to a memory system 210, as illustrated in FIG. 2B, in which the memory system controller 220 may exchange data and commands with the various memory modules 211 through 21n. As discussed above, according to some embodiments, each of the memory modules 211 through 21n, may each include a plurality of memory devices (e.g., NVM devices), each having the same write confirmation policies within the same memory module.

In some example embodiments according to the present invention, a new command may be issued by the memory controller to the NVM devices. For example, the new command may be the extended write (EWR) command with confirmation, illustrated in the various timing diagrams above. According to some example embodiments, the EWR command may include information including one or more of, but may not be limited to, the following: 1) Chip ID ($C_2$, $C_1$, $C_0$, etc.); 2) Bank and Bank group ID (BA[1:0], BG[1:0]); and 3) Column address (A13-11*, A9-0). For example, the column address may be programmable to support different row buffer size (e.g., device page size).

FIG. 15 is an example of a new command set that reuses a current command set that is not used for NVM devices according to one or more example embodiments of the present invention. The commands that may be reused may include for example, but may not be limited to, a write with auto precharge (WRA) command, a write with burst chop (WRS4) command, and/or the like. As can be seen in FIG. 15, for example, a write with auto precharge (Fixed BL8 or BC4) (WRA) command may be reused as an extended write (EWR) command.

FIG. 16 is another example of a new command set that is not used in current DDR protocol according to one or more example embodiments of the present invention. For example, current reserve for future use (RFU) sets may be used as the new command for EWR as shown in FIG. 16.

Figure 17:
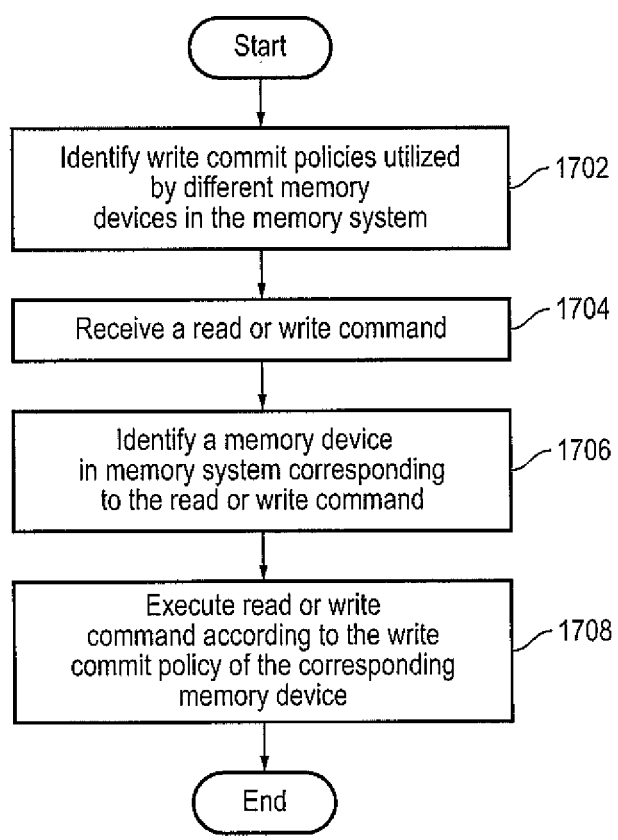
FIG. 17 is a flow diagram illustrating a process of controlling a memory system having a plurality of nonvolatile memory devices with different write commit policies according to some example embodiments of the present invention.

FIG. 17 is a flow diagram illustrating a process of controlling a memory system having a plurality of NVM devices with different write commit policies according to some example embodiments of the present invention. According to some embodiments, the number of operations and the order of operations for controlling the memory system may vary. That is, according to some embodiments, the process may include additional operations or the order of the operations may vary.

As shown in FIG. 17, the process starts and at 1702, the memory system identifies the write commit policies utilized by each of the different memory devices (e.g., the NVM devices) included in the memory system. That is, according to embodiments of the present invention, as discussed above, the memory system may include a plurality of different memory devices (e.g., NVM devices) implemented according to different memory (e.g., NVM) technologies and having different write commit policies discussed above. The memory system and/or a memory controller included within the memory system may identify the write commit policies of the various memory devices (e.g., NVM devices) by way of a readout from the SPD area of each of the respective memory devices (e.g., NVM devices) or from one or more SPD chips of the memory module(s). According to some embodiments, such write commit policies may be identified at startup or booting of the computer system and/or the memory system.

At 1704, the memory system receives a read or write command, for example, from an external processor or controller. Then, at 1706, the memory system identifies a memory device or memory devices (e.g., an NVM device or NVM devices) corresponding to the read or write command and, at 1708, the memory system executes the read or write command according to the write commit policy of the corresponding memory device (e.g., NVM device(s)).

Thus, according to embodiments of the present invention, a memory system may include a plurality of different memory devices (e.g., NVM devices) having different write commit policies incorporated into the same memory system or component, and the memory system may perform read and write operations according to the write commit policies of each memory device (e.g., NVM device) in the system.

In the drawings, the relative sizes of elements, layers, and regions may be exaggerated and/or simplified for clarity. It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. Further, the various operations may be a process or thread, running on a processor or controller executing computer program instructions and interacting with other system components for performing the various functionalities described herein. The computer program instructions may be stored in a memory or non-transitory computer readable medium coupled to a processor or controller that, when executed by the processor or controller, cause the processor or controller to perform the operations or functionality described herein. According to some embodiments of the present invention, the various components of the memory system may be integrated or combined as part of a single component, chip, or device.

Although the present invention has been described with reference to the example embodiments, those skilled in the art will recognize that various changes and modifications to the described embodiments may be performed, all without departing from the spirit and scope of the present invention. Furthermore, those skilled in the various arts will recognize that the present invention described herein will suggest solutions to other tasks and adaptations for other applications. It is the applicant's intention to cover by the claims herein, all such uses of the present invention, and those changes and modifications which could be made to the example embodiments of the present invention herein chosen for the purpose of disclosure, all without departing from the spirit and scope of the present invention. Thus, the example embodiments of the present invention should be considered in all respects as illustrative and not restrictive, with the spirit and scope of the present invention being indicated by the appended claims, and their equivalents.

What is claimed is:

1. A memory system comprising:
one or more memory modules, each comprising a plurality of memory devices having corresponding write commit policies, wherein a first memory device from among the memory devices has a first write commit policy defining when a first write is confirmed after a first type of operation, and a second memory device from among the memory devices has a second write commit policy defining when a second write is confirmed after the first type of operation, the second write commit policy being different from the first write commit policy, wherein the first write commit policy comprising a write operation without write confirmation is identified based on a first write commit data stored as part of serial presence detect (SPD) information of the first memory device and the second write commit policy comprising another write operation with write confirmation is identified based on a second write commit data stored as part of SPD information of the second memory device; and
one or more memory controllers coupled to the one or more memory modules, the one or more memory controllers having a configurable write operation protocol to operate with the memory devices according to corresponding write commit policies.

2. The memory system of claim 1, wherein the first memory device from among the memory devices has the first write commit policy in which the first write is confirmed after directly writing to memory cells of the first memory device.

3. The memory system of claim 2, wherein the second memory device from among the memory devices has the second write commit policy in which the second write is confirmed after writing to a volatile data buffer.

4. The memory system of claim 3, wherein a third memory device from among the memory devices does not use write confirmation after page open.

5. The memory system of claim 1, wherein the one or more memory controllers are configured to receive SPD information for the memory devices at power up of the memory system.

6. The memory system of claim 1, wherein the one or more memory controllers are configured to reuse a double data rate generation 4 (DDR4) command that is not utilized for nonvolatile memory devices as a write operation command.

7. The memory system of claim 1, wherein the one or more memory controllers are configured to utilize a command from among a set of commands reserved for future use (RFU) as a write operation command.

8. The memory system of claim 1, wherein the memory system comprises a plurality of memory modules, wherein each of the memory devices in a same memory module have a same write commit policy that is different from a write commit policy of the memory devices in a different memory module.

9. The memory system of claim 1, wherein the one or more memory controllers are configured to support both open page and close page policies.

10. A method of controlling a memory system comprising one or more memory modules, each comprising a plurality of memory devices having corresponding write commit policies, the method comprising:

identifying a write commit policy utilized by each of the memory devices based on a readout of a write commit data stored as part of serial presence detect (SPD) information of each of the memory devices, wherein a first memory device from among the memory devices has a first write commit policy comprising a write operation without write confirmation defining when a first write is confirmed after a first type of operation, and a second memory device from among the memory devices has a second write commit policy comprising another write operation with write confirmation defining when a second write is confirmed after the first type of operation, the second write commit policy being different from the first write commit policy;

receiving a write command from a processor;

identifying the first memory device from among the plurality of memory devices that corresponds to the write command; and executing the write command according to the first write commit policy of the first memory device.

11. The method of claim 10, wherein the first memory device from among the memory devices has the first write commit policy in which the first write is confirmed after directly writing to memory cells of the first memory device.

12. The method of claim 11, wherein the second memory device from among the memory devices has the second write commit policy in which the second write is confirmed after writing to a volatile data buffer.

13. The method of claim 12, wherein a third memory device from among the memory devices does not use write confirmation after page open.

14. The method of claim 10, wherein the memory system further comprises a memory controller coupled to the memory devices and having a configurable write operation protocol to operate with the memory devices according to their respective write commit policies.

15. The method of claim 14, wherein the memory system comprises a plurality of memory modules, wherein each of the memory devices in a same memory module have a same write commit policy that is different from a write commit policy of the memory devices in a different memory module.

16. A memory system comprising:

one or more memory modules, each comprising a plurality of memory devices having corresponding write commit policies; and one or more memory controllers coupled to the one or more memory modules, wherein the one or more memory controllers are configured to:

identify a write commit policy utilized by each of the memory devices based on a readout of a write commit data stored as part of serial presence detect (SPD) information of each of the memory devices, wherein a first memory device from among the memory devices has a first write commit policy comprising a write operation without write confirmation defining when a first write is confirmed after a first type of operation, and a second memory device from among the memory devices has a second write commit policy comprising another write operation with write confirmation defining when a second write is confirmed after the first type of operation, the second write commit policy being different from the first write commit policy;

receive a write command from a processor;

identify the first memory device from among the plurality of memory devices that corresponds to the write command; and execute the write command according to the first write commit policy of the first memory device.

17. The memory system of claim 16, wherein the first memory device from among the memory devices has the first write commit policy in which the first write is confirmed after directly writing to memory cells of the first memory device.

18. The memory system of claim 17, wherein a second memory device from among the memory devices has the second write commit policy in which the second write is confirmed after writing to a volatile data buffer.

19. The memory system of claim 18, wherein a third memory device from among the memory devices does not use write confirmation after page open.

* * * * *